(12) United States Patent
Krumrei et al.

(10) Patent No.: US 11,072,022 B2
(45) Date of Patent: Jul. 27, 2021

(54) MOULDS FOR INVESTMENT CASTING, METHODS OF MAKING SUCH MOULDS AND USE THEREOF

(71) Applicant: ImerTech SAS, Paris (FR)

(72) Inventors: Thomas Krumrei, Wernberg (AT); Scot Graddick, Buford, GA (US); Danilo Frulli, Enghien-les-Bains (FR); Joachim Wolff, Laufenburg (DE)

(73) Assignee: ImerTech SAS, Paris (FR)

( * ) Notice: Subject to any disclaimer, the term of this patent is extended or adjusted under 35 U.S.C. 154(b) by 150 days.

(21) Appl. No.: 15/743,370

(22) PCT Filed: Jul. 8, 2016

(86) PCT No.: PCT/EP2016/066241
§ 371 (c)(1),
(2) Date: Jan. 10, 2018

(87) PCT Pub. No.: WO2017/009216
PCT Pub. Date: Jan. 19, 2017

(65) Prior Publication Data
US 2018/0193902 A1 Jul. 12, 2018

(30) Foreign Application Priority Data

Jul. 10, 2015 (EP) .................................... 15306147

(51) Int. Cl.
*B22C 1/18* (2006.01)
*C04B 35/14* (2006.01)
(Continued)

(52) U.S. Cl.
CPC ................. *B22C 1/18* (2013.01); *B22C 9/12* (2013.01); *C04B 35/119* (2013.01); *C04B 35/14* (2013.01);
(Continued)

(58) Field of Classification Search
CPC ................ B22C 1/18; B22C 9/04; B22C 9/12
See application file for complete search history.

(56) References Cited

U.S. PATENT DOCUMENTS

| 5,677,371 A | 10/1997 | Guerra |
| 6,540,013 B1 | 4/2003 | Doles |

(Continued)

FOREIGN PATENT DOCUMENTS

| EP | 1 122 002 A1 | 8/2001 |
| EP | 1 207 975 A1 | 5/2002 |

(Continued)

OTHER PUBLICATIONS

International Search Report and Written Opinion dated Aug. 12 2016, in International Application No. PCT/EP2016/066241 (13 pgs.).

*Primary Examiner* — Kevin P Kerns
*Assistant Examiner* — Steven S Ha
(74) *Attorney, Agent, or Firm* — Finnegan, Henderson, Farabow, Garrett & Dunner, LLP

(57) ABSTRACT

The present invention relates to investment casting moulds comprising a furnace dust, wherein said furnace dust comprises $ZrO_2$ and/or $Al_2O_3$. The present invention also relates to investment casting moulds comprising a metal oxide dust comprising $ZrO_2$ and one or more materials selected from alumina, silica and aluminosilicate, and wherein said metal oxide dust has a $d_{50}$ of 10 μm or less. The invention also relates to compositions for the production of investment casting moulds, the use of dusts in the formation of investment casting moulds, and the use of investment casting moulds of the invention.

19 Claims, 2 Drawing Sheets

Figure 1:
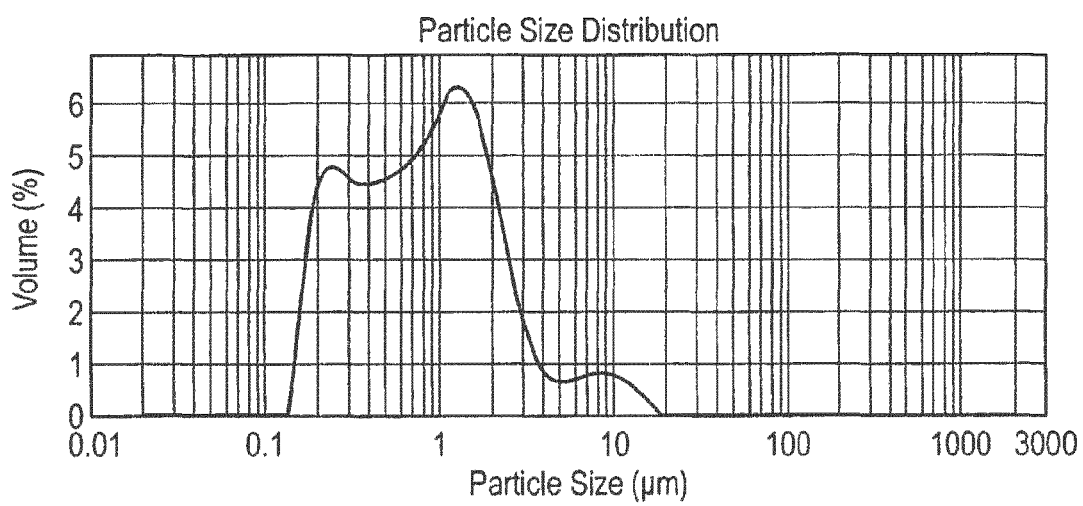

(51) Int. Cl.
  *C04B 35/622* (2006.01)
  *C04B 35/18* (2006.01)
  *B22C 9/12* (2006.01)
  *C04B 35/119* (2006.01)
  *C04B 35/626* (2006.01)
  *C04B 35/63* (2006.01)
  *B22C 1/16* (2006.01)

(52) U.S. Cl.
  CPC .......... *C04B 35/18* (2013.01); *C04B 35/6263* (2013.01); *C04B 35/62204* (2013.01); *C04B 35/6316* (2013.01); *B22C 1/162* (2013.01); *C04B 2235/3217* (2013.01); *C04B 2235/3244* (2013.01); *C04B 2235/349* (2013.01); *C04B 2235/3418* (2013.01); *C04B 2235/5436* (2013.01); *C04B 2235/5445* (2013.01); *C04B 2235/5463* (2013.01)

(56) References Cited

U.S. PATENT DOCUMENTS

| | | |
|---|---|---|
| 2004/0083926 A1 | 5/2004 | Mitkova et al. |
| 2005/0199366 A1* | 9/2005 | Vandermeer ............ B22C 7/023 164/518 |
| 2008/0210844 A1* | 9/2008 | Nycz ........................ B22C 9/04 249/134 |
| 2014/0194328 A1 | 7/2014 | Alessi |
| 2015/0315083 A1* | 11/2015 | Deters ..................... B22C 9/02 164/16 |

FOREIGN PATENT DOCUMENTS

| | | |
|---|---|---|
| JP | 1995-04744 A | 2/1995 |
| JP | 2003-507189 | 2/2003 |
| JP | 2004-519334 | 7/2004 |
| JP | 2004-528988 | 9/2004 |
| RU | 2 146 983 C1 | 3/2000 |
| WO | WO 2001/14082 | 3/2001 |
| WO | WO 2002/100571 | 12/2002 |
| WO | WO 2006/107345 A1 | 10/2006 |
| WO | WO 2014/094721 A2 | 6/2014 |
| WO | WO 2014/094722 A2 | 6/2017 |

\* cited by examiner

MOULDS FOR INVESTMENT CASTING, METHODS OF MAKING SUCH MOULDS AND USE THEREOF

CLAIM FOR PRIORITY

This application is a U.S. national phase entry under 35 U.S.C. § 371 from PCT International Application No. PCT/EP2016/066241, filed Jul. 8, 2016, which claims the benefit of priority of EP Application No, 15306147.8, filed Jul. 10, 2015, both of which this application claims priority and both of which are incorporated herein by reference.

FIELD OF THE INVENTION

The present invention relates to moulds for investment casting comprising $ZrO_2$-containing metal oxide dusts. The invention also concerns compositions comprising $ZrO_2$-containing and/or $Al_2O_3$-containing metal oxide dusts, or furnace dusts, for the production of investment casting moulds, as well as the use of metal oxide dusts, such as for example furnace dusts, which are produced as a by-product in certain metal oxide production and treatment processes in such composition and investment casting moulds. Also disclosed is the use of investment casting moulds according to the invention and the products obtained therefrom.

BACKGROUND OF THE INVENTION

The manufacture by arc furnace technology of various fused metal oxides, such as for example fused zirconia, fused alumina-zirconia or brown fused and semi-friable alumina, affords furnace dusts as a by-product. In plants in most industrialised countries, these furnace dusts are collected in accordance with environmental regulations and need to be disposed of or used in some way. In an early discussion of that problem, U.S. Pat. No. 4,297,309 discloses methods for compacting and drying silica dusts issued from electric furnaces for easy storage and transport. However, few applications or opportunities for the recycling of these by-products are known.

Investment casting, also known as lost-wax casting, is one of the oldest metal forming techniques known. Investment casting allows the production of small castings with high precision and reproducibility. It can be used to obtain complicated shapes that would be difficult or impossible to obtain with other techniques.

In general, the investment casting moulds are formed of solids deriving from (a) stucco, (b) filler load from a ceramic slurry and (c) solid portion of binder from the ceramic slurry and are produced by repeated dipping of an expendable pattern into the ceramic slurry. After each dipping step, the slurry adhering to the pattern is allowed to dry to form a solid green ceramic layer. Before the drying, the slurry may or may not be covered with a dry refractory particulate composition, the stucco. In this way, the investment casting mould is produced layer by layer. Before the application of a subsequent slurry and stucco layer, the previous layer must be dry. Ceramic slurries for the use in investment casting are typically made with water-based or alcohol-based inorganic binders (such as colloidal silica), a powdered refractory filler and organic additives, such as wetting agents, de-foaming agents, biocides and/or green strength enhancers, such as liquid polymers.

U.S. Pat. No. 8,087,450 B2 discloses the use of fumed metal oxides, such as for example fumed silica, as an additional component besides binders and refractory fillers in slurries for forming investment casting moulds. Fumed metal oxides, or pyrogenic metal oxides, are produced on purpose and due to the production process are rather expensive.

The use of microsilica, or silica fume, in slurries for producing investment casting moulds has been described extensively, such as for example in U.S. Pat. No. 6,540,013 B1. It was found that incorporation of about 5 wt.-% of at least one microsilica into an investment casting shell effectively increased the strength and solids level of the shell.

WO 2006/107345 A1 further discloses the use of fibers in investment casting shell molds and their methods of manufacture. The fibers may be organic or inorganic, chopped or milled.

Ways for obtaining even better strength and higher solids level, as well as more efficient formation processes are constantly being sought.

SHORT DESCRIPTION OF THE INVENTION

The present invention is defined in the appended claims.

In particular, the present invention is embodied by an investment casting mould, comprising a furnace dust which comprises $ZrO_2$ and/or $Al_2O_3$.

The present invention is further embodied by an investment casting mould, comprising a metal oxide dust, wherein the metal oxide dust comprises $ZrO_2$ and one or more materials selected from alumina, silica and aluminosilicate, and wherein the metal oxide dust has a $d_{50}$ of 10 µm or less.

It was found that investment casting moulds according to the present invention had improved or equivalent strength, and improved or better solids levels than those according to the state of the art. It was also found that the formation process was quicker.

According to one embodiment of the present invention, the metal oxide dust or furnace dust is present in the investment casting mould in an amount of 0.5 to 25 wt.-%, based on the total solids content of the mould. It was found that with these amounts of metal oxide dust, the advantages were most notably obtained.

According to one embodiment of the present invention, the metal oxide dust present in the investment casting mould comprises greater than 75 wt.-% silica and up to 25 wt.-% $ZrO_2$. According to one embodiment of the present invention, the metal oxide dust present in the investment casting mould comprises greater than 40 wt.-% alumina, 25 to 50 wt.-% silica and 5 to 25 wt.-% $ZrO_2$. It was found that such compositions provided especially strong improvements over the prior art.

According to one embodiment of the present invention, the metal oxide dust or furnace dust included in the investment casting mould comprises no more than 3 wt.-% of impurities other than alumina, silica, aluminosilicate and $ZrO_2$. It was found that at higher impurity levels, the improvements over the prior art were not as pronounced as hoped.

According to one embodiment of the present invention, the metal oxide dust or furnace dust included in the investment casting mould has a $d_{50}$ of 5 µm or less. According to one embodiment of the present invention, the metal oxide dust or furnace dust included in the investment casting mould has a $d_{90}$ of 50 µm or less. According to one further embodiment of the present invention, the metal oxide dust or furnace dust included in the investment casting mould metal oxide dust has a $d_{99}$ of 100 µm or less. It was found that the advantages were obtained particularly with metal oxide dusts or furnace dusts having such specific particle size distributions. According to the present invention, the mentioned values for $d_{50}$, $d_{90}$ and $d_{99}$ may be present independently or in combination.

According to one embodiment of the present invention, the metal oxide dust or furnace dust included in the investment casting mould has a multimodal particle size distribution, such as for example a bimodal particle size distribution. It was found that good improvements could be obtained with such particle size distributions.

According to one embodiment of the present invention, the investment casting mould further comprises a kaolin. According to a further embodiment of the present invention, the investment casting mould does not comprise any fumed silica. It was found that the presence of kaolin, or metakaolin, which is also possible, provided good properties to the final product.

According to one embodiment of the present invention, the metal oxide dust included in the investment casting mould is a furnace dust. The furnace dust may have been obtained as a by-product from the production of fused zirconia or fused alumina-zirconia, for example in an electric arc furnace. It was found that furnace dusts are suitable for application in the present invention, and the invention provides a way of recycling said furnace dusts.

According to one embodiment of the present invention, the said investment casting mould further comprises organic fibers and/or ceramic fibers. The addition of such fibers provides added stability to the moulds.

The present invention also provides a composition for the production of an investment casting mould. The composition according to the invention comprises a metal oxide dust as defined above, and optionally a kaolin or a metakaolin.

According to one embodiment of the invention, the inventive composition is a slurry for forming an investment casting mould. For example, the composition may be a water-based slurry or an alcohol-based slurry. The use of the inventive compositions in slurries for forming investment casting moulds is shown as advantageous over prior art compositions.

According to one embodiment of the invention, the inventive composition is a slurry having a filler load of 60 wt.-% or more and a viscosity according to Zahn Cup 4 of 35 s or less. Slurries with higher filler load are advantageous for forming investment casting moulds. It was found that the use of the metal oxide fumes as described herein leads to compositions with improved filler load while maintaining viscosity at an acceptable level.

According to one embodiment of the invention, the inventive compositions further comprise organic fibers and/or ceramic fibers. The addition of such fibers provides added stability to the moulds.

Also part of the present invention is the use of a metal oxide dust or a furnace dust as defined herein for producing an investment casting mould. According to this embodiment, improved methods and improved compositions for making investment casting moulds were obtained, while at the same time recycling an easily available product which would otherwise have to be disposed of. Also, by using the metal oxide dust or furnace dust as defined herein, improved investment casting moulds could be obtained.

Also part of the present invention are methods of forming investment casting moulds comprising the application of a metal oxide dust or furnace dust as defined herein form a slurry.

Also part of the present invention is the use of investment casting moulds as described herein in the production of cast articles, as are cast articles obtained from such investment casting moulds.

SHORT DESCRIPTION OF THE FIGURES

Figure 2:
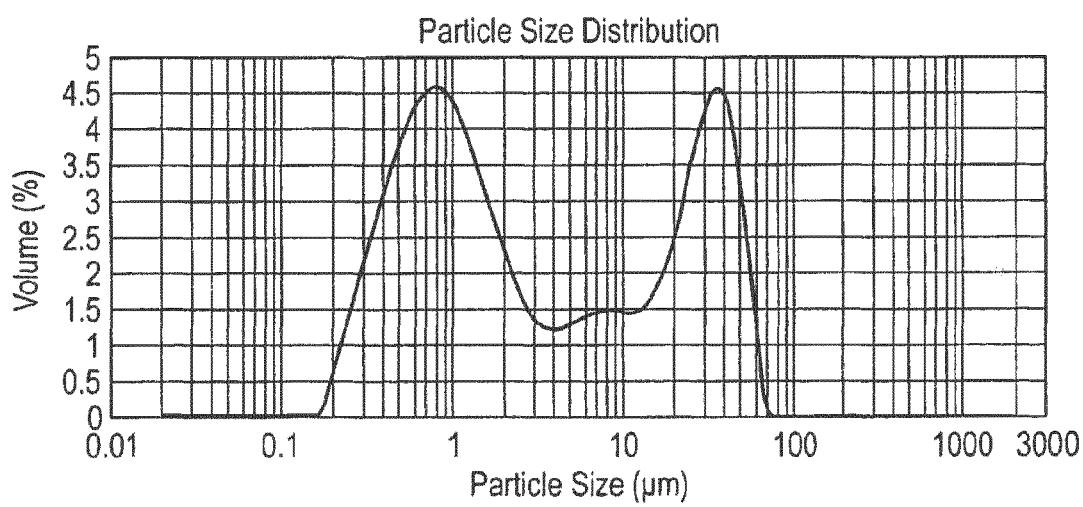
Figure 3:
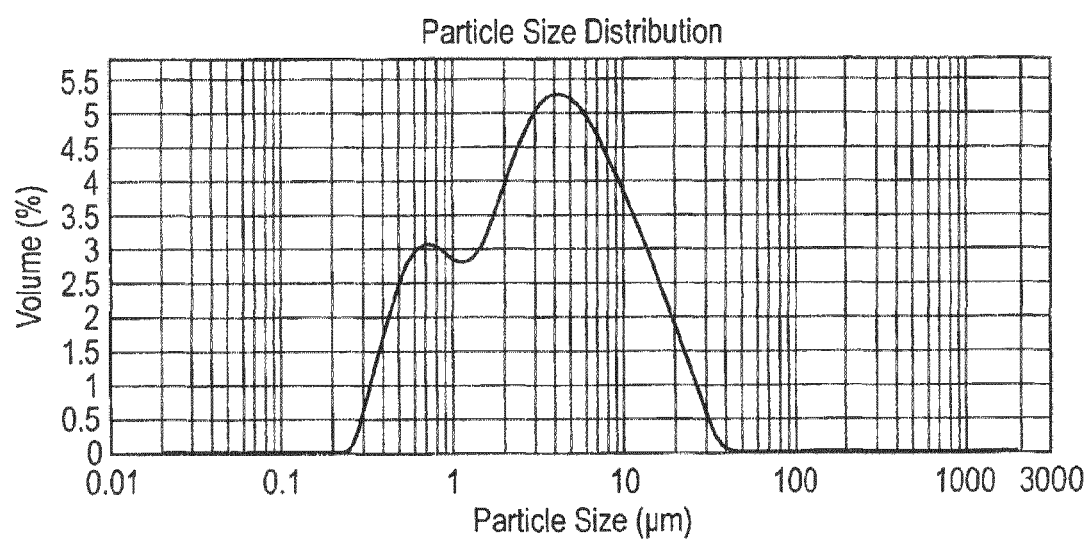
Figure 4:
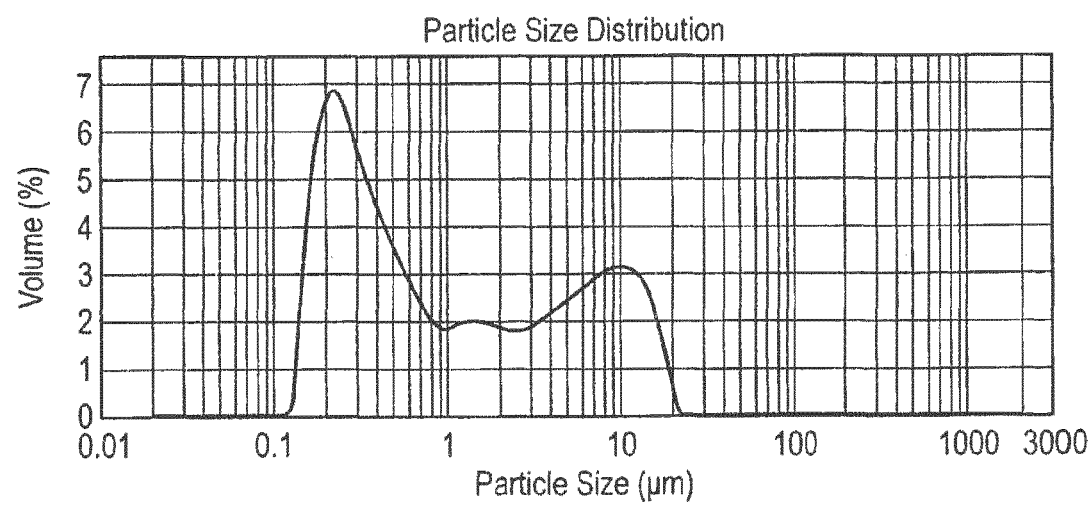

The invention will be further illustrated by reference to the following figures:
FIG. 1 represents the particle size distribution, measured by laser scattering, of a metal oxide dust composition for use in the present invention (Composition A);
FIG. 2 represents the particle size distribution, measured by laser scattering, of a metal oxide dust composition for use in the present invention (Composition B);
FIG. 3 represents the particle size distribution, measured by laser scattering, of a metal oxide dust composition for use in the present invention (Composition C).
FIG. 4 represents the particle size distribution, measured by laser scattering, of a metal oxide dust composition, the use of which does not fall within the scope of the present invention (Composition D).

It is understood that the following description and references to the figures concern exemplary embodiments of the present invention and shall not be limiting to the scope of the claims.

DETAILED DESCRIPTION OF THE INVENTION

As used herein, the term "silica fume" (CAS number 69012-64-2), or microsilica designates an amorphous polymorph of silicon dioxide ($SiO_2$), which is a powder with an average primary particle size of about 150 nm, and more generally from 80 nm to 5 μm. Silica fume particles have a strong tendency to form agglomerates with a diameter of up to 50 μm. Silica fume has a BET surface area of greater than 15 $m^2/g$, and typically up to 30 $m^2/g$, and may be obtained as a by-product from the production of silicon, ferrosilicon or fused silica, for example.

As used herein, the term "fumed silica" (CAS number 112945-52-5), or pyrogenic silica, designates microscopic droplets of amorphous silica fused into branched chain-like particles which have a tendency to agglomerate. The primary particle size is in the range of 5 to 50 nm and the BET surface area is typically from 50 to 600 $m^2/g$. Fumed silica is produced by a rather complex pyrogenic process.

As used herein, "colloidal silica" designates suspensions of amorphous, non-porous silica particles in a liquid phase, such as in water or in an alcohol.

As used herein, the term "fused silica", or fused quartz, designates a glass of amorphous silica.

As used herein, the term "furnace dust" designates any fine particulate composition obtained as a by-product in the operation of furnaces, such as for example electric arc furnaces used in the manufacture of fused metal oxides. In many jurisdictions, furnace dusts are collected in line with environmental legislation, rather than being released into the atmosphere.

As used herein, the term "metal oxide dust" designates dusts comprising a major portion of metal oxides, such as dusts comprising more than 70 wt.-% metal oxides, or more than 80 wt.-% metal oxides, or more than 90 wt.-% metal oxides, or more than 95 wt.-% metal oxides or more than 99 wt.-% metal oxides. Metal oxide dusts may be furnace dusts and may contain a mixture of several metal oxides. As used herein, metal oxide dusts may have a particle size distribution such that the $d_{50}$ is 50 µm or less, or 30 µm or less, or 20 µm or less, or 15 µm or less, or 10 µm or less, or 5 µm or less.

As used herein, the alumina content of a composition describes the amount of aluminium oxide, as well as any aluminium oxide portion of aluminosilicate in a composition.

As used herein, the silica content of a composition describes the amount of silicon dioxide, as well as any silicon dioxide portion of aluminosilicate in a composition.

Throughout the present application, particle size distributions were measured using laser light scattering with a Malvern Mastersizer 2000. Prior to the measurement, samples were dispersed in water, and an ultrasonic treatment was applied for full de-agglomeration of the sample. As used herein, the values $d_{10}$, $d_{50}$, $d_{90}$ and $d_{99}$ when describing particle size distributions define the particle size at which 10% of particles, or 50% of particles, or 90% of particles or 99% of particles, as the case may be are smaller than the value.

The present invention according to the appended claims provides moulds for use in investment casting. According to one embodiment of the present invention, the said investment casting moulds comprise a $ZrO_2$-containing and/or an $Al_2O_3$-containing furnace dust. According to one embodiment of the present invention, the said investment casting moulds comprise a $ZrO_2$-containing metal oxide dust. The metal oxide dust may typically be a furnace dust which may be recycled into the investment casting moulds according to the present invention.

In the production of the investment casting moulds of the present invention, the metal oxide dusts, or furnace dusts, are incorporated into a mould forming slurry. It was found that the presence of these dusts as additives has a plasticising effect on the slurries, leading to a reduction of viscosity or, conversely, to the possibility of forming stable slurries with a higher solids content and reduced liquids content at acceptable viscosity. The presence of the metal oxide dusts or furnace dusts in the ceramic slurries for formation of the investment casting moulds according to the invention allows an increased layer thickness after each dipping step of an expendable pattern into the ceramic slurry. Accordingly, the final thickness of the mould is obtained using fewer dipping steps, leading to improved usability of the method of formation of the moulds, reducing time required, cost, effort and propensity to errors or accidents in the manufacturing process, to name just a few. Furthermore, less energy is required to evaporate the reduced liquid amounts contained in the ceramic slurries between dipping steps. Finally, it was found that a more homogeneous coating of sharp surfaces in the expendable pattern was obtained in the investment casting moulds according to the present invention.

Without wanting to be bound by theory, it is thought that the addition of metal oxide dusts, or furnace dusts, into the slurries improves the rheology of the slurries by impacting on particle sedimentation processes. In particular, slurries having a broad particle size distribution of their solids content and with significant amounts of coarse particles are stabilised by reduction of sedimentation rates of coarse particles.

According to the present invention, metal oxide dusts, or furnace dusts, are employed as additives in dipping slurries for the formation of investment casting moulds. In one embodiment, the furnace dusts for use in this application are specific in that they comprise a $ZrO_2$-content and/or an $Al_2O_3$-content. In one embodiment, the metal oxide dusts for use in this application are specific in that they comprise a $ZrO_2$-content, as well as one or more materials selected from alumina, silica and aluminosilicate, and in that they have a $d_{50}$ of 10 µm or less.

According to the present invention, the $ZrO_2$-content of the metal oxide dusts, or furnace dusts, for use in dipping slurries may be from 1 wt.-% to 25 wt.-%, based on the total amount of solids in the metal oxide dust. For example, the $ZrO_2$-content of the metal oxide dusts may be from 2 wt.-% to 22.5 wt.-% or from 3 wt.-% to 20 wt.-%, or from 4 wt.-% to 17.5 wt.-%, or from 5 wt.-% to 15 wt.-%, or from 10 wt.-% to 25 wt.-%, or from 10 wt.-% to 20 wt.-%, or from 10 wt.-% to 15 wt.-%, such as for example about 2.5 wt.-%, or about 5 wt.-%, or about 10 wt.-%, or about 15 wt.-% $ZrO_2$-content in the metal oxide dusts.

According to the present invention, the metal oxide dusts, or furnace dusts, for use in dipping slurries for investment casting moulds may have a $d_{50}$ of 10 µm or less, such as for example a $d_{50}$ of 0.5 µm to 10 µm, or a $d_{50}$ of 0.75 µm to 8 µm, or a $d_{50}$ of 1 µm to 6 µm, or a $d_{50}$ of 1.5 µm to 5 µm, or a $d_{50}$ of 0.5 µm to 2.5 µm, or a $d_{50}$ of 0.5 µm to 2.0 µm, such as for example a $d_{50}$ of about 1 µm, or about 2 µm, or about 3 µm, or about 4 µm, or about 5 µm, or about 6 µm, or about 7 µm, or about 8 µm, or about 9 µm, or about 10 µm.

Furthermore, the metal oxide dusts, or furnace dusts, for use in dipping slurries for investment casting moulds may have a $d_{10}$ of 1 µm or less, such as for example a $d_{10}$ of 0.01 µm to 1 µm, or a $d_{10}$ of 0.05 µm to 0.9 µm, or a $d_{10}$ of 0.1 µm to 0.8 µm, or a $d_{10}$ of 0.2 µm to 0.7 µm, or a $d_{10}$ of 0.1 µm to 0.4 µm, such as for example a $d_{10}$ of about 0.3 µm, or about 0.4 µm, or about 0.5 µm, or about 0.6 µm, or about 0.7 µm, or about 0.8 µm, or about 0.9 µm, or about 1 µm.

Furthermore, the metal oxide dusts, or furnace dusts, for use in dipping slurries for investment casting moulds may have a $d_{90}$ of 50 µm or less, such as for example a $d_{90}$ of 1 µm to 50 µm, or a $d_{90}$ of 2.5 µm to 40 µm, or a $d_{90}$ of 5 µm to 30 µm, or a $d_{90}$ of 10 µm to 25 µm, such as for example a $d_{90}$ of about 3 µm, or about 5 µm, or about 10 µm, or about 20 µm, or about 30 µm, or about 40 µm.

Furthermore, the metal oxide dusts, or furnace dusts, for use in dipping slurries for investment casting moulds may have a $d_{99}$ (top cut) of 100 µm or less, such as for example a $d_{99}$ of 10 µm to 100 µm, or a $d_{99}$ of 20 µm to 80 µm, or a $d_{99}$ of 25 µm to 75 µm, or a $d_{99}$ of 30 µm to 70 µm, such as for example a $d_{99}$ of about 10 µm, or about 20 µm, or about 30 µm, or about 40 µm, or about 50 µm, or about 60 µm, or about 70 µm, or about 80 µm, or about 90 µm, or about 100 µm.

According one embodiment of to the present invention, the metal oxide dusts, or furnace dusts, for use in dipping slurries for investment casting moulds may have a multimodal particle size distribution. For example, the particle size distribution may be bimodal, or the particle size distribution may be trimodal, or the particle size distribution may have a modality higher than trimodal.

As used herein, a multimodal particle size distribution is a particle size distribution, wherein an envelope curve of size distribution of the particles obtained by laser light scattering exhibits several distinct peaks. As used herein, the "envelope curve of particle size distribution" denotes the curve of size distribution of all the particles in a specific sample. For example, in the case of a trimodal particle size distribution, the envelope curve of size distribution of the particles obtained by laser light scattering exhibits three distinct peaks, and in the case of a bimodal particle size distribution, the envelope curve of size distribution of the particles obtained by laser light scattering exhibits two distinct peaks.

According one embodiment of to the present invention, the metal oxide dusts, or furnace dusts, for use in dipping slurries for investment casting moulds may have a BET surface area of 5 to 20 m$^2$/g, such as for example from 10 to 15 m$^2$/g, or from 10 to 20 m$^2$/g, or from 5 to 15 m$^2$/g, such as for example about 7 m$^2$/g, or about 8 m$^2$/g, or about 9 m$^2$/g, or about 10 m$^2$/g, or about 11 m$^2$/g, or about 12 m$^2$/g, or about 13 m$^2$/g, or about 14 m$^2$/g, or about 15 m$^2$/g about 16 m$^2$/g, or about 17 m$^2$/g, or about 18 m$^2$/g, or about 19 m$^2$/g, or about 20 m$^2$/g.

In general, the metal oxide dusts, or furnace dusts, for use according to the present invention may be coarser than commercially available silica fume.

According to the present invention, the $ZrO_2$-containing metal oxide dusts, or furnace dusts, further comprise at least one of silica, alumina or aluminosilicate. For example, the $ZrO_2$-containing metal oxide dust for use in the present invention may contain zirconia and silica, or it may contain zirconia and alumina, or it may contain zirconia and aluminosilicate, or it may contain zirconia, alumina and silica, for example.

According to the present invention, the $Al_2O_3$-containing furnace dusts further comprise at least one of silica or aluminosilicate. For example, the $Al_2O_3$-containing furnace dust for use in the present invention may contain $Al_2O_3$ and silica, or it may contain $Al_2O_3$ and aluminosilicate, or it may contain $Al_2O_3$, aluminosilicate and silica, for example.

In certain embodiments, the metal oxide dusts, or furnace dusts, for use in the present invention may comprise greater than 25 wt.-% silica, such as for example from 25 wt.-% to 50 wt.-% silica, or from 30 wt.-% to 45 wt.-% silica, or from 35 wt.-% to 40 wt.-% silica, or for example greater than 75 wt.-% silica or greater than 80 wt.-% silica, such as from 75 wt.-% to 95 wt.-% silica, or from 75 wt.-% to 90 wt.-% silica, or from 75 wt.-% to 85 wt.-% silica, or from 80 wt.-% to 95 wt.-% silica, or from 85 wt.-% to 95 wt.-% silica. For example, the metal oxide dust for use in the present invention may comprise about 25 wt.-% silica, or about 30 wt.-% silica, or about 35 wt.-% silica, or about 40 wt.-% silica, or about 45 wt.-% silica, or about 50 wt.-% silica, or about 55 wt.-% silica, or about 60 wt.-% silica, or about 65 wt.-% silica, or about 70 wt.-% silica, or about 75 wt.-% silica, or about 80 wt.-% silica.

In certain other embodiments, the metal oxide dusts, or furnace dusts, for use in the present invention may comprise greater than 40 wt.-% alumina, such as for example greater than 45 wt.-% alumina, or greater than 50 wt.-% alumina, for example from 40 wt.-% to 60 wt.-% alumina, or from 40 wt.-% to 55 wt.-% alumina, or from 40 wt.-% to 50 wt.-% alumina, or from 45 wt.-% to 55 wt.-% alumina, or from 50 wt.-% to 60 wt.-% alumina. For example, the metal oxide dusts, or furnace dusts, for use in the present invention may comprise about 40 wt.-% alumina, or about 41 wt.-% alumina, or about 42 wt.-% alumina, or about 43 wt.-% alumina, or about 44 wt.-% alumina, or about 45 wt.-% alumina, or about 46 wt.-% alumina, or about 47 wt.-% alumina, or about 48 wt.-% alumina, or about 49 wt.-% alumina, or about 50 wt.-% alumina.

The silicon and aluminium atoms may be present in the metal oxide dust in the form of aluminosilicates. Accordingly, as described herein, a description indicating a presence of certain amount of silica also includes the case where this concerns the silicon oxide portion of an aluminosilicate. Also, as described herein, a description indicating a presence of certain amount of alumina also includes the case where this concerns the aluminium oxide portion of an aluminosilicate.

According to the present invention, metal oxide dusts, or furnace dusts, with any possible combination of amounts of $ZrO_2$, silica and alumina described hereinabove may be employed.

According to one embodiment of the present invention, the metal oxide dusts, or furnace dusts, may further comprise one or more materials selected from kaolin and metakaolin. The said kaolin and/or may be calcined, for example fully calcined or partially calcined. For example, kaolinitic clay may be included in the said metal oxide dust, according to one embodiment of the invention.

The skilled person in the art will be aware that investment casting moulds may be formed of solids deriving from (a) stucco, (b) filler load from a slurry and (c) solid portion of binder from the slurry. Accordingly, the ratio of material in the investment casting mould provided by the stucco may be in the range of from 30 to 80 wt.-%, such as for example about 60 wt.-%. The ratio of material in the investment casting mould provided by the filler portion in the slurry may be in the range of from 10 to 50 wt.-%, such as for example about 30 wt.-%. Finally, the ratio of material in the investment casting mould provided by the solid binder portion in the slurry may be in the range of from 5 to 20 wt.-%, such as for example about 10 wt.-%.

According to the present invention the investment casting moulds may comprise up to about 25 wt.-% of the said metal oxide dusts, or furnace dusts, based on the total solids content of the investment casting moulds, such as for example from 0.5 wt.-% to 20 wt.-%, or from 0.75 wt.-% to 15 wt.-%, or from 1 wt.-% to 10 wt.-%, or from 1 wt.-% to 8 wt.-%, such as for example about 0.5 wt.-%, or about 1 wt.-%, or about 1.5 wt.-%, or about 2 wt.-%, or about 3 wt.-%, or about 4 wt.-%, or about 5 wt.-%, or about 6 wt.-%, or about 7 wt.-%, or about 8 wt.-%, or about 9 wt.-%, or about 10 wt.-%, or about 11 wt.-%, or about 12 wt.-%, or about 13 wt.-%, or about 14 wt.-%, or about 15 wt.-%, or about 16 wt.-%, or about 17 wt.-%, or about 18 wt.-%, or about 19 wt.-%, or about 20 wt.-% metal oxide dust, or furnace dust, based on the total solids content of the investment casting moulds.

According to one embodiment of the present invention, the metal oxide dust for use in the invention may not contain more than 3 wt.-% impurities. As used herein, impurities in the metal oxide dust is considered anything besides $ZrO_2$, silica, alumina or aluminosilicate. For example, the metal oxide dust for use in the invention may not contain more than 2 wt.-% impurities, or no more than 1 wt.-% impurities or no more than 0.5 wt.-% impurities. Also part of the present invention are compositions for making investment casting moulds of the present invention. These compositions may be water-based or alcohol-based slurries. It is also conceivable that said compositions be used in a dry particulate powder in stuccoing. The mentioned slurries may comprise the metal oxide dusts, or furnace dusts, for use in the present invention, for example in an amount of up to about 25 wt.-% of the said metal oxide dust, or furnace dust, based on the filler load of the slurry, such as for example from 0.5 wt.-% to 20 wt.-%, or from 0.75 wt.-% to 15 wt.-%, or from 1 wt.-% to 10 wt.-%, or from 1. wt.-% to 8 wt.-%, such as for example about 0.5 wt.-%, or about 1 wt.-%, or about 1.5 wt.-%, or about 2 wt.-%, or about 3 wt.-%, or about 4 wt.-%, or about 5 wt.-%, or about 6 wt.-%, or about 7 wt.-%, or about 8 wt.-%, or about 9 wt.-%, or about 10 wt.-%, or about 11 wt.-%, or about 12 wt.-%, or about 13 wt.-%, or about 14 wt.-%, or about 15 wt.-%, or about 16 wt.-%, or about 17 wt.-%, or about 18 wt.-%, or about 19 wt.-%, or about 20 wt.-% metal oxide dust, or furnace dust, based on the filler load content of the slurry.

It was found by the inventors that the presence of metal oxide dusts, or furnace dusts, as described herein in the slurries for forming investment casting moulds has a plasticising effect on the slurries. In other words, the slurries comprising these metal oxide dusts, or furnace dusts, have a lower viscosity, or may have a filler load, and lower liquids content, for the same viscosity as the slurries not comprising said metal oxide dusts. This allows to provide slurries with a higher filler load, which leads to improvements in the production process of investment casting moulds, while at the same time the investment casting moulds have equivalent or improved properties.

The compositions according to the present invention may be slurries having a filler load of 60 wt.-% or more, such as for example a solids content from 60 wt.-% to 75 wt.-%, or for example from 65 wt.-% to 73 wt.-%, or for example from 70 wt.-% to 72 wt.-%, such as for example a solids content of about 60 wt.-%, or about 65 wt.-%, or about 66 wt.-%, or about 67 wt.-%, or about 68 wt.-%, or about 69 wt.-%, or about 70 wt.-%, or about 71 wt.-%, or about 72 wt.-%, or about 73 wt.-%, or about 74 wt.-%, or about 75 wt.-%.

The compositions according to the present invention may be slurries having a viscosity according to Zahn 4 of 35 s or less, such as for example a viscosity according to Zahn 4 of 7 s to 35 s, or for example a viscosity according to Zahn 4 of 8 s to 30 s, or of 9 s to 25 s, or of 10 s to 20 s, such as for example about 10 s, or about 12 s, or about 14 s, or about 16 s, or about 18 s, or about 20 s.

The higher filler load of the slurries used for formation of the investment casting moulds leads, for example, to an improved layer thickness obtained after each dipping event, which in turn reduces the number of dips required until an investment casting mould with the requires thickness is formed. Also, the reduced liquids amount in the slurry causes a reduction of both time and energy required for the hardening of the layer formed after each dip. The easy availability of the metal oxide dusts used according to the present invention is an added advantage.

According to one embodiment of the present invention, the investment casting moulds and compositions for making such investment casting moulds further comprise ceramic fibers and/or organic fibers. Such fibers are known, for example from WO 2006/107345 A1, and help reducing fragility and tendency to break. The presence of organic and/or inorganic fibers enables application of thicker coatings to perform.

The added fibers can be inorganic or organic, chopped or milled. They may be selected from ceramic fibers or organic fibers such as nylon or polypropylene.

Ceramic fibers suitable for use in the present invention may have an aspect ratio of length to width of about 20:1, such as for example wollastonite fibers. metal fibers, aramid fibers, carbon fibers, refractory fibers, as well as chopped or milled ceramic fibers such as aluminosilicates such as mullite, oxides such as alumina and zirconia, nitrides such as silicon nitride, carbon, and carbides such as silicon carbide, and mixtures thereof. Chopped and milled ceramic fibers are commercially available from numerous sources.

Glass fibers suitable for use in the present invention include chopped and milled glass fibers, such as E-glass fibers and S-glass fibers and mixtures thereof. The glass fibers may, for example, have a length of about 3 mm to about 6 mm, and/or a diameter of about 10 microns.

Organic fibers suitable for use in the present invention include olefins, amides, aramids, polyesters and cellulose fibers. Examples of olefins may include polyethylene and polypropylene. Examples of amide fibers may include nylon. Examples of aramid fibers may include Kevlar and Twaron.

The amount of fiber in the compositions according to the present invention may be varied over a wide range, as known to the skilled person in the art.

It should be noted that the present invention may comprise any combination of the features and/or limitations referred to herein, except for combinations of such features which are mutually exclusive. The foregoing description is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

EXAMPLES

In the following, modulus of rupture (CMOR) was measured in accordance with a 3-point bending test device on shell samples which were produced as described below.

As used herein, viscosities "according to Zahn" are determined according to standard ASTM D4212.

Two compositions A and B were used as metal oxide dusts. Composition A is a by-product from zirconia production and composition B is a by-product from alumina-zirconia production. Composition C is a raw kaolin for use in combination with metal oxide dusts. Composition D is a microsilica and used in comparative examples. The properties are shown in Table I. The contents of $Al_2O_3$, $ZrO_2$ and $SiO_2$ were measured using XRF in an ARL Advant XP (Thermo Scientific). The particle size distributions of the compositions are graphically represented in FIGS. 1 to 3.

TABLE I

| Composition | $Al_2O_3$ | $SiO_2$ wt.-% | $ZrO_2$ | $d_{10}$ | $d_{50}$ μm | $d_{90}$ | $d_{99}$ |
|---|---|---|---|---|---|---|---|
| A | — | 90 | 10 | 0.23 | 0.86 | 2.83 | 12 |
| B | 50 | 37 | 13 | 0.41 | 2.01 | 39.5 | 61 |
| C | 34 | 49 | <0.5 | 0.64 | 3.52 | 13.6 | 28 |
| D | — | >99 | — | 0.19 | 0.69 | 10.7 | 18 |

A base filler mixture for the slurries to be tested was used. The base filler mixture comprises about 50 wt.-% alumina-silica (200 mesh) and about 50 wt.-% fused silica (120 mesh and 50 to 100 mesh). When slurried with aqueous inorganic binder, the base solids mixture displays sedimentation of the coarser fractions, nearly immediately when agitation is stopped.

Compositions A, B, C and/or D were admixed to the said base filler mixture in order to obtain a fraction of the filler comprising 5 wt.-%, 10 wt.-%, or 20 wt.-% composition A, B, C and/or C, as the case may be. The addition of the compositions A, B, C and/or D lead to a slowing down of the sedimentation rate in the slurry.

The slurries were tested in investment casting shell production. Various slurries according to the present invention were prepared to a filler load that could be maintained as a stable slurry. The slurry properties are listed in Table II.

TABLE II

| Example | Composition wt.-% | Filler load wt.-% | Viscosity (Zahn 4) s |
|---|---|---|---|
| Ex. 1 | 5 (A) | 72 | 19 |
| Ex. 2 | 10 (A) | 72.5 | 19 |
| Ex. 3 | 20 (A) | 72.5 | 18 |
| Ex. 4 | 10 (B) | 71 | 22 |
| Ex. 5 | 10 (5 A + 5 C) | 70 | 19 |
| Comp. Ex. 1 | — | 67 | 19 |
| Comp. Ex. 2 | 10 (D) | 71.5 | 18 |

All the compositions according to the present invention (Examples 1 to 5) have improved or equivalent filler load at equivalent viscosity when compared to the Comparative Examples 1 (no additive) and 2 (silica fume).

In a next step, investment casting shells were produced following a common investment casting procedure. A wax pattern was immersed into the respective slurries for about 30 s, then excess slurry was allowed to drain off the pattern. Stucco sand (aluminosilicate) was applied by rain-fall sander on the still wet slurry layers. These were then dried for 3 to 4 hours at 45 to 55% rel. humidity and a temperature of 20 to 22° C. All shells were built with 6 dips in total. The first dip was stuccoed with sand at 0.2 to 0.5 mm, the following 4 dips were stuccoed with sand at 0.5 to 1.0 mm. The sixth and final dip was applied as a seal coat, without stuccoing.

After this procedure, the shell thicknesses and cold modulus of rupture (CMOR) of the finished shells were then measured. CMOR was measured on the green product and after firing at 1350° C. The results are shown in Table III:

TABLE III

| Example | shell thickness mm | CMOR (green) | CMOR (1350° C.) MPa |
|---|---|---|---|
| Ex. 1 | 7.8 | 4.6 | 4.2 |
| Ex. 2 | 7.7 | 4.9 | 5.7 |
| Ex. 4 | 7.7 | 6.6 | 4.9 |
| Ex. 5 | 9.0 | 5.1 | 4.9 |
| Comp. Ex. 1 | 6.2 | 5.1 | 4.0 |
| Comp. Ex. 2 | 8.0 | 5.2 | 5.3 |

All the compositions according to the present invention (Examples 1, 2, 4 and 5) have improved or equivalent shell thicknesses and modulus of rupture than Comparative Examples 1 (no additive) and 2 (silica fume).

The invention claimed is:

1. An investment casting mould comprising a fine particulate composition, wherein said fine particulate composition comprises $ZrO_2$ and/or $Al_2O_3$; and wherein said fine particulate composition comprises no more than 3 wt. % of impurities other than alumina, silica, aluminosilicate and $ZrO_2$.

2. An investment casting mould according to claim 1, wherein said fine particulate composition is present in an amount of 0.5 to 25 wt. %, based on the total solids content of the mould.

3. An investment casting mould according to claim 1, wherein said mould further comprises a kaolin and/or metakaolin.

4. An investment casting mould according to claim 1, further comprising ceramic fibers and/or organic fibers.

5. An investment casting mould according to claim 1, wherein said fine particulate composition has a $d_{50}$ of 5 μm or less, a $d_{90}$ of 50 μm or less, and a $d_{99}$ of 100 μm or less.

6. An investment casting mould comprising a dust, wherein said dust comprises $ZrO_2$ and one or more materials selected from alumina, silica and aluminosilicate, and wherein said dust has a $d_{50}$ of 10 μm or less, and wherein said dust comprises no more than 3 wt. % of impurities other than alumina, silica, aluminosilicate and $ZrO_2$.

7. An investment casting mould according to claim 6, wherein said dust is present in an amount of 0.5 to 25 wt.-%, based on the total solids content of the mould.

8. An investment casting mould according to claim 6, wherein said dust comprises greater than 75 wt. % silica and up to 25 wt. % $ZrO_2$.

9. An investment casting mould according to claim 6, wherein said dust comprises greater than 40 wt.-% alumina, 25 to 50 wt. % silica and 5 to 25 wt. % $ZrO_2$.

10. An investment casting mould according to claim 6, wherein said dust has a $d_{50}$ of 5 μm or less, a $d_{90}$ of 50 μm or less, or a $d_{99}$ of 100 μm or less.

11. An investment casting mould according to claim 6, wherein said dust has a multimodal particle size distribution.

12. An investment casting mould according to claim 6, wherein said mould further comprises a kaolin and/or metakaolin.

13. An investment casting mould according to claim 6, wherein said dust is a furnace dust obtained as a by-product from the production of fused zirconia or fused alumina-zirconia.

14. An investment casting mould according to claim 6, further comprising ceramic fibers and/or organic fibers.

15. An investment casting mould according to claim 6, wherein said dust has a $d_{50}$ of 5 μm or less, a $d_{90}$ of 50 μm or less, and a $d_{99}$ of 100 μm or less.

16. A composition for the production of an investment casting mould, said composition comprising a dust wherein said dust comprises $ZrO_2$ and one or more materials selected from alumina, silica and aluminosilicate, and wherein said metal oxide dust has a $d_{50}$ of 10 μm or less, and wherein said dust comprises no more than 3 wt. % of impurities other than alumina, silica, aluminosilicate and $ZrO_2$.

17. A composition according to claim 16, wherein said composition is a water-based slurry or an alcohol-based slurry.

18. A composition according to claim 16, wherein said composition is a slurry having a filler load of 60 wt. % or more and a viscosity according to Zahn 4 of 35 s or less.

19. A composition according to claim 16, further comprising ceramic fibers and/or organic fibers.

* * * * *